P. SYLLA.
Improvement in Joints for Desks or Seats.
No. 115,383.          Patented May 30, 1871.
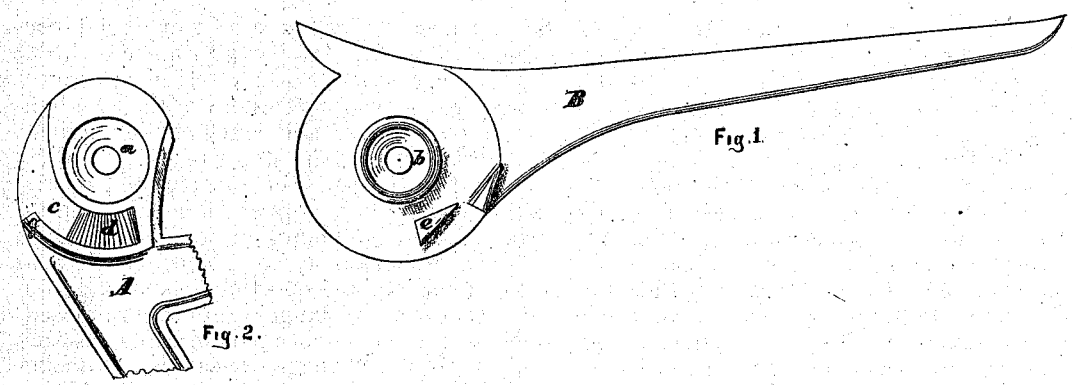
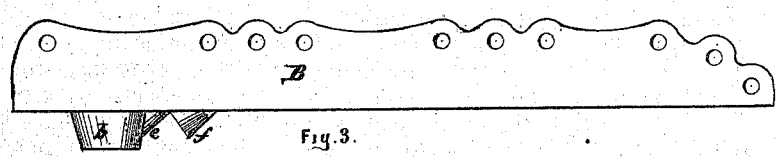
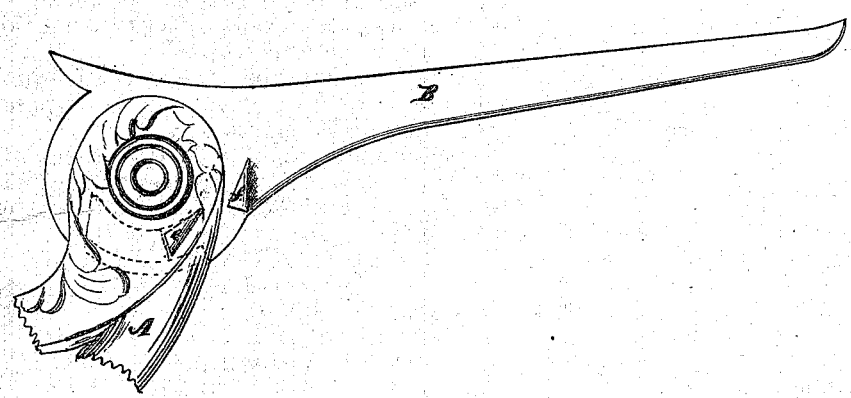

UNITED STATES PATENT OFFICE.

LAVINIA SYLLA AND WILLIAM F. SYLLA, OF ELGIN, ILLINOIS, ADMINISTRATORS OF PHILO SYLLA, DECEASED.

IMPROVEMENT IN JOINTS FOR DESKS OR SEATS.

Specification forming part of Letters Patent No. 115,383, dated May 30, 1871.

We, LAVINIA SYLLA and WILLIAM F. SYLLA, of Elgin, in the county of Kane and State of Illinois, administrators of the estate of PHILO SYLLA, deceased, do hereby declare the following is a specification of the invention of said PHILO SYLLA of an Improvement in Joint for Settee and School-Desk Seat.

The invention relates to that class of joints for school-desk and settee-seats, in which the joint consists of a hub turning in a socket, by the side of which socket there is a slat of a curved shape containing a piece of rubber or elastic substance, against which strikes the stop carried upon that limb of the joint which bears the hub; and this invention consists in constructing the said joint with an additional stop arranged to strike against the solid metal of the joint, so that when the rubber becomes softened and compressed by wear the seat cannot drop lower than a given distance, regulated by the position of said stop, which is so placed that the seat cannot drop too low for use.

In the accompanying drawing, Figures 1 and 2 are inside views of the two limbs of the joint constructed after this invention; Fig. 3 is a top or plan view of Fig. 1; and Fig. 4 is a side elevation of the two limbs of the joint engaged or joined.

General Description.

A represents that limb of the joint which is borne by the frame-legs or standards, and is the immovable or stationary limb. B represents the movable limb or support, which carries the seat-bottom. The limb A is made with a socket, $a$, and a curved slot, $c$, in which slot is placed a piece of rubber or like elastic substance, $d$. The limb B is furnished with a hub, $b$, and two stops, $e\ f$, of which the stop $e$ is arranged to play in the slot $c$ of limb A when the joint is engaged, and which strikes against the rubber $d$, while the stop $f$ is placed a little further from the center of rotation, and a little distance behind the stop $e$, being arranged to strike against the point $g$ of standard or limb A. The rubber $d$ may be of considerable size in this joint, and a proportionate spring given to the seat without danger of its being pressed down so far as to be uncomfortable, as the stop $f$ is so placed that the seat cannot move down beyond the point at which it will be comfortable.

In the ordinary use of the seat the function of this additional stop is not exercised; but it comes effectively into use when a more than usual weight is placed upon the seat, and also when the rubber has become softened, as it inevitably will, after use; and by the employment of this stop the seat is not rendered wholly useless, as in ordinary seats, when the rubber fails to perform its office.

Having thus described this invention and its operation, what we claim, and desire to secure by Letters Patent, is—

The additional stop $f$, in combination with the stop $e$ and the joint, for settee and school-desk seat, above described, as and for the purpose specified.

LAVINIA SYLLA.
WILLIAM F. SYLLA.

Witnesses:
S. J. SMITH,
CHARLES H. SMITH.